Patented June 5, 1951

2,555,603

UNITED STATES PATENT OFFICE 2,555,603

AMINO-CYCLOHEXYLCYCLOHEXANE SALTS OF DYESTUFF ACIDS

James Ogilvie, Buffalo, N. Y., assignor to Allied Chemical & Dye Corporation, New York, N. Y., a corporation of New York No Drawing. Application December 20, 1946, Serial No. 717,619

2 Claims. (Cl. 260—439)

This invention relates to new coloring matters of the type which are formed by the combination of an organic base with the free acid form of a water-soluble organic dyestuff. It relates more particularly to improved coloring matters of said type having excellent fastness to light and good solubility in alcohols and related organic solvents.

It is known to prepare coloring matters which are soluble in organic solvents by reacting a water-soluble organic dyestuff containing at least one salt-forming acid group (a sulfonic acid or carboxylic acid group) with an organic base. Usually the dyestuff in the form of a water-soluble salt (generally the sodium salt) is reacted in water with the organic base in the presence of an acid (for example, hydrochloric acid, sulfuric acid, acetic acid, etc.) or with a water-soluble salt of the base (for example, a salt with one of the acids last mentioned). The resulting coloring matter is a salt-like reaction product of the free acid form of the water-soluble dyestuff (the sulfonic acid or carboxylic acid form of the dyestuff) with the organic base.

For many purposes the known coloring matters of this type have inadequate solubility in alcoholic solvents to produce solutions and compositions having the desired tinctorial strength; or, if the solubility is adequate, the coloring matters do not have adequate light-fastness.

I have discovered that coloring matters of said type having improved solubility in alcoholic solvents, as well as good fastness to light, are obtained by combining a particular group of said water-soluble organic dyestuffs with a particular group of cycloaliphatic amines, to form salt-like reaction products of the free acid form of the dyestuff and the amine.

Thus I have found that salt-like reaction products of an amino-cyclohexylcyclohexane (an amino derivative of dodecahydro-biphenyl) with a water-soluble dyestuff of the nitroso, azo, and triphenylmethane series in the free acid form are substantially insoluble (that is, insoluble or difficultly soluble) in water and hydrocarbon solvents, but are soluble in alcoholic solvents (for example, methyl alcohol, ethyl alcohol, diethylene glycol, beta-ethoxyethanol, monoethyl ether of diethylene glycol, etc.), and are fast to light. In general they surpass known related products in solubility in alcoholic solvents or light-fastness, and in many cases they excel both in alcohol-solubility and in light-fastness.

Those coloring matters which are derived from 2-amino-cyclohexylcyclohexane are preferred.

The compounds of the present invention may be represented, in the case of a dyestuff having a single salt-forming acid group (for example, a carboxyl or sulfo group), by the following general formula:

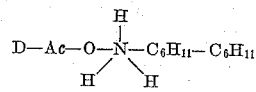

wherein D—Ac represents the radical of an organic dyestuff of the nitroso, azo, or triphenylmethane series, Ac representing a radical of an oxygen acid (for example, a $C{=}O$ or $SO_2$ group).

In the case of coloring matters derived from dyestuffs having more than one salt-forming acid group each combined with an amino-cyclohexylcyclohexane, the coloring matters may be represented by the following general formula:

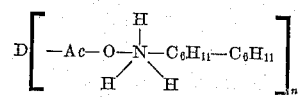

wherein D and Ac have the meaning referred to above, and $n$ represents an integer equal to the number of salt-forming acid groups.

The coloring matters of the present invention may be prepared by reacting in aqueous medium at moderate temperatures, say below 100° C., a water-soluble dyestuff of the nitroso, azo or triphenylmethane series with an amine of the type described above, or a salt thereof derived from an acid which forms a water-soluble sodium salt (such as hydrochloric acid, sulfuric acid, and acetic acid), preferably acetic acid. The relatively water-insoluble salt-like product thus formed by combination of the free acid form of the dyestuff with the amine may be separated by filtration, or otherwise, and dried. Instead of effecting the reaction in an aqueous medium, the dyestuff (in the form of the free acid) may be reacted with the amine in a suitable organic solvent (such as, ethyl alcohol), and the resulting salt-like reaction product may be recovered by evaporating the solvent, or by diluting the solution with water.

The dyestuff and amine (or salt thereof) may be employed in various proportions. For the production of amine salts possessing maximum solubility in alcoholic solvents and minimum solubility in water the dyestuff and the amine (or salt thereof) are preferably combined in substantially stoichiometric proportions; that is, about one mol of amine for each salt-forming acid group (e. g. carboxylic acid or sulfonic acid group) per mol of dyestuff. However, other proportions may be used, and the invention includes salt-like reaction products resulting from the use of greater, as well as lesser, amounts than are required stoichiometrically. The use of less than the stoichiometric amount of amine leads to salt-like reaction products whose solubility in alcoholic solvents is correspondingly decreased and whose solubility in water is correspondingly increased. In general, the amine is employed somewhat in excess of the stoichiometric amount; but a large excess of amine (for example, an amount equal to or greater than twice the stoichiometric proportion) is preferably avoided since the excess amine tends to cling to the resulting amine salt, thereby causing it to be more or less tacky.

The coloring matters of the present invention may be employed for various purposes wherein their high solubility in alcohols and their insolubility or limited solubility in water and hydrocarbon solvents, combined with their excellent light-fastness, is advantageous. For example, they may be employed as such, or in combination with usual substrates (e. g. blanc fixe, alumina, etc.), for coloring a wide variety of materials in shades generally characterized by excellent fastness to light. They may be used to color cellulose acetate and other synthetic and natural resins. They are suitable for application as wood stains or for the coloring of paper and may be applied for these purposes in alcoholic solution. Similarly, they may be used for the preparation of colored shellacs, or lacquers and varnishes containing cellulose ester or other synthetic or natural resins.

The invention will be illustrated by the following specific examples in which parts are by weight and temperatures are in degrees centigrade.

Example 1

10 parts of Naphthol Green B (Color Index No. 5) were dissolved in 400 parts of hot (80°) water. A mixture of 8 parts of 2-amino-cyclohexylcyclohexane,

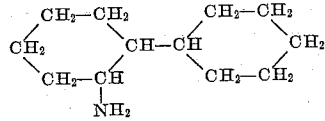

and 3 parts of glacial acetic acid in 75 parts of water was added during about 1 hour to the hot (80°) solution. The 2-amino-cyclohexylcyclohexane salt of Naphthol Green B was formed and precipitated. The reaction mixture was agitated for an additional hour to ensure complete precipitation of the amine salt, and the agitated mass was allowed to cool for 16 hours, after which the amine salt was separated from the clear mother liquor by filtration, dried at 60°, and ground to a powder.

The 2-amino-cyclohexylcyclohexane salt of Naphthol Green B thus obtained was a green powder, substantially insoluble in water, benzene, toluene, acetone, and kerosene. It dissolved in methyl alcohol, ethyl alcohol, diethylene glycol, beta-ethoxyethanol and mono-ethyl ether of diethyleneglycol to form green solutions. It possessed greater brightness of shade, tinctorial strength and fastness to light than the corresponding amine salts of Naphthol Green B derived from dicyclohexylamine ($C_6H_{11}.NH.C_6H_{11}$), diamylamine, and triamylamine, when compared in the form of "pour-outs" of alcohol solutions of the amine salts on glazed paper and filter paper.

Example 2

20 parts of Crocein Scarlet M00 (Color Index No. 252) were dissolved in 400 parts of water at 80°. A mixture of 12 parts of 2-amino-cyclohexylcyclohexane and 5 parts of glacial acetic acid in 100 parts of water was stirred into the resulting solution during about one hour. The 2-amino-cyclohexylcyclohexane salt of Crocein Scarlet M00 was formed and precipitated. The reaction mixture was agitated at 80° for about an additional hour to completely precipitate the amine salt, was allowed to cool to room temperature during 16 hours, and then was filtered. The filter-cake of amine salt was dried at 60° and ground to a powder.

The 2-amino-cyclohexylcyclohexane salt of Crocein Scarlet M00 thus obtained was a red powder substantially insoluble in water, benzene, and kerosene. It dissolved readily in ethyl alcohol and diethylene glycol to form bright-red solutions of good tinctorial strength. It possessed greater fastness to light than the corresponding dicyclohexylamine salt of Crocein Scarlet M00.

Example 3

10 parts of Wool Violet 5BN (Color Index No. 697) were dissolved in 400 parts of water at 80°. To the resulting solution, a mixture of 8 parts of 2-amino-cyclohexylcyclohexane and 3 parts of glacial acetic acid in 100 parts of water was added during about one hour. The 2-amino-cyclohexylcyclohexane salt of Wool Violet 5BN was formed and precipitated. The reaction mixture was agitated for an additional hour at 80° to complete precipitation of the amine salt, which was separated by filtration, dried at about 60°, and ground to a powder.

The 2-amino-cyclohexylcyclohexane salt of Wool Violet 5BN thus obtained was a violet powder substantially insoluble in water, benzene, and kerosene. It dissolved readily in methyl alcohol and ethyl alcohol, yielding bright-violet solutions of good tinctorial strength. It possessed excellent fastness to light, surpassing in this respect the corresponding dicyclohexylamine salt of Wool Violet 5BN.

Example 4

10 parts of a dyestuff of the stilbene azo polysulfonic acid type, obtained by condensing one mol of 4,4'-dinitrostilbene-2,2'-disulfonic acid with two mols of 4-amino-3-methoxyazobenzene-3'-sulfonic acid in aqueous alkaline medium and subjecting the resulting condensation product to a mild reduction with aqueous sodium sulfide, were dissolved in 400 parts of hot (80°) water. A mixture of 8 parts of 2-amino-cyclohexylcyclohexane and 3 parts of glacial acetic acid in 75 parts of water was added during 1 hour to the hot solution, and the resulting mass was further agitated for about an hour at 80°. The 2-amino-cyclohexylcyclohexane salt of the stilbene azo dyestuff which precipitated was separated by filtration, dried at 80°, and ground to a powder.

The stilbene azo dyestuff salt thus obtained dissolved readily in methyl alcohol and ethyl alcohol, yielding bright orange solutions. It possessed excellent fastness to light. As compared to the corresponding dicyclohexylamine salt of said stilbene azo dyestuff, it was faster to light and more soluble in ethyl alcohol.

It will be evident to those skilled in the art that the invention is not limited to details of the foregoing examples and that changes may be made without departing from the scope of the invention.

Thus, instead of the 2-amino-cyclohexylcyclohexane employed in the above example, other amino-cyclohexylcyclohexanes may be employed in equivalent amounts, for example, 3-amino-cyclohexylcyclohexane and 4-amino-cyclohexylcyclohexane.

Instead of the dyestuffs employed in the above examples, other water-soluble organic nitroso dyestuffs (especially those having at least one sulfonic acid group), other water-soluble organic azo dyestuffs (including monoazo dyestuffs and polyazo dyestuffs having at least one salt-forming acid group, and especially at least one sulfonic acid group), and other water-soluble organic triphenylmethane dyestuffs (particularly those having at least one salt-forming acid group, and especially at least one sulfonic acid group) may be employed in equivalent amounts.

Other proportions of amine (or salt thereof) and dyestuff may be employed. As indicated above, for the production of salt-like reaction products having optimum solubility in alcoholic solvents, the amine is preferably employed in an amount equal to about one mol or more per salt-forming acid group per mol of dyestuff.

I claim:

1. A salt-like reaction product of an amino-cyclohexylcyclohexane with the free acid form of Naphthol Green B, said salt-like reaction product being substantially insoluble in water and hydrocarbon solvents, but soluble in alcoholic solvents.

2. A 2-amino-cyclohexylcyclohexane salt of the free acid form of Naphthol Green B, said salt being substantially insoluble in water and hydrocarbon solvents, but soluble in alcoholic solvents.

JAMES OGILVIE.

REFERENCES CITED

The following references are of record in the file of this patent:

UNITED STATES PATENTS

| Number | Name | Date |
|---|---|---|
| 1,800,299 | Kranzlein et al. | Apr. 14, 1931 |
| 1,800,300 | Kranzlein et al. | Apr. 14, 1931 |
| 2,095,077 | Payne | Oct. 5, 1937 |
| 2,241,247 | Dickey | May 6, 1941 |
| 2,259,641 | Horning | Oct. 21, 1941 |
| 2,315,870 | Nadler et al. | Apr. 6, 1943 |
| 2,363,561 | Smith et al. | Nov. 28, 1944 |

FOREIGN PATENTS

| Number | Country | Date |
|---|---|---|
| 491,958 | Great Britain | Sept. 8, 1938 |